Sept. 19, 1967      A. G. COOLEY      3,343,173

PHOTOFACSIMILE RECORDER

Filed July 30, 1965      10 Sheets-Sheet 1

FIG. 7

Sept. 19, 1967  A. G. COOLEY  3,343,173
PHOTOFACSIMILE RECORDER
Filed July 30, 1965  10 Sheets-Sheet 6

Sept. 19, 1967 A. G. COOLEY 3,343,173
PHOTOFACSIMILE RECORDER
Filed July 30, 1965 10 Sheets-Sheet 8

FIG.19

Sept. 19, 1967  A. G. COOLEY  3,343,173
PHOTOFACSIMILE RECORDER
Filed July 30, 1965  10 Sheets-Sheet 10

3,343,173
PHOTOFACSIMILE RECORDER
Austin G. Cooley, Torrance, Calif., assignor to Litton Systems, Inc., Beverly Hills, Calif.
Filed July 30, 1965, Ser. No. 476,109
15 Claims. (Cl. 346—24)

This invention relates to photofacsimile recorders of the continuous web type, and particularly to recorders adapted for unattended operation. In the specific embodiment of the invention to be described, the recording apparatus is of the type that may be employed in a picture transmitting system for the automatic recording and processing of news photos and pictures of superior quality.

In prior automatic or continuous recorders, such as that described for example in my prior Patent No. 1,719,392 dated July 2, 1929, the message or intelligence to be recorded was in graphic or black and white form where minute variations in the position of the recording elemental areas and in the advance or feeding of the recording web were not important. In order to record high quality photographic material and obtain a usable reproduction, it is necessary to avoid variations in scanning and line feed as small as a fraction of a thousandth of an inch. It is usually desirable to employ as the recording medium photographic paper, which is a heavy coated sheet having much less resiliency or stretch than the thin plastic film normally used in video recording. The term "stretch" refers to the amount of extension or elongation of the paper when subjected to tension. Thus in a recorder where the web is curved or folded at the point of recording, the lack of compliance in photographic paper requires smooth and extremely uniform folding and advance of the paper to avoid wrinkling and irregular line feed. On the other hand, the coating of emulsion on the paper is delicate and easily marred, which would also render the recorded material unusable or of poor quality.

Hitherto the requirement for precise scanning movement in photo recorders, in order to avoid line grouping or vignetting, has been met by mounting the recording sheet on a rotating drum, driven at constant speed, with uniform scanning movement of the recording lamp provided by an accurate lead screw, cf., my prior Patent No. 2,907,826 granted Oct. 6, 1959. This construction has the disadvantage that, being designed for a recording of fixed dimensions, recording material is wasted when smaller pictures are received. This is a serious drawback in a large newsphoto network where many pictures are received every day in each receiving station. Furthermore an attendant is required to reload the recorder after each transmission, and the recorder must be located in a darkroom unless a special construction is used, for example replaceable light-tight film holders as described in the patent to H. Carlson, No. 2,182,115 granted Dec. 5, 1939. These limitations of the drum-type recorder are overcome by the continuous automatic recorder of the present invention.

In general terms, the object of the invention is to provide an improved automatic facsimile recorder of this type which employs a continuous web of photographic film or paper and is arranged to provide unattended operation over long periods of time, and in which the recorded photographic copy may be automatically processed immediately after it is recorded if desired.

Another object of the invention is to provide a photofacsimile recorder of the type set forth having improved means for feeding a continuous web or strip of recording material through the recorder assembly, and for severing and delivering each recorded photo from the continuous web or strip.

Another object of the invention is to record photos, pictures or messages of different sizes with economical use of the film or recording paper, i.e., reducing the marginal or unrecorded areas to a minimum when severing the recorded material from the continuous web or strip.

A further object of the invention is to provide in a recorder of the type set forth novel means for handling the web of film or paper and for transferring the severed sheet after recording to the processing unit in which the photo is developed and fixed.

A still further object of the invention is to provide means for automatically controlling the operation of a photofacsimile recorder in response to electric current and facsimile signals from a remote transmitter, including mechanism for starting, phasing, severing and developing the recorded photo, and stopping the recorder after each transmission.

In accordance with the present invention, the recorder includes a rotating optical system for exposing the web of light-sensitive material, either film or paper, in response to modulated facsimile signals representing the tone gradations of the elemental areas of the picture or copy being transmitted. By way of example, the photographic recording paper is supplied from a roll and may be of a type which includes the developer in the coating. When the developer is activated by a solution which is maintained at room temperature, the latent image on the paper will be developed in a matter of a few seconds. After development the recording is passed through a stabilizer solution which prevents further development upon exposure to light. The automatic processor per se forms no part of the present invention and any appropriate processing apparatus may be employed.

The supply of recording paper is fed from a cassette which protects the unexposed portion of the paper when the light-tight cabinet of the recorder is opened. The web or strip of recording paper is formed or folded into a trough shape which is held in arcuate configuration by a curved guide at the recording point opposite the rotating optical scanning system. The configuration is preferably semi-circular, permitting a dual scanning arrangement to be used consisting of the conventional arrangement of two diametrically opposed objective lenses which focus the light from the recording lamp onto the surface of the semi-circular recording web as the scanner rotates. It will be seen that an approximately straight line can be drawn from the lip of the cassette through the semi-circular guide at the recording line. However if the web is drawn from the cassette in a vertical direction, for example, distortion of the recording line will result from the folding of the paper if the plane of the optical scanning system is horizontal or at a right angle to the vertical span of recording paper. In order to overcome this distortion, in accordance with a feature of the invention, the axis of the scanning system is tilted so that the recording spots at the center and at each end of the scanning line (at the opposite edges of the paper web) are equidistant from the lip of the cassette.

In order to form the web into a semi-circular cross-section without wrinkling the paper and also advance the paper uniformly during the recording cycle, a gripper is provided at the center of the top of the web, said gripper being actuated to pull the web slowly and at constant speed from the cassette and through the semi-circular guide disposed at the recording point. The movement of the gripper follows a straight line along the center of the web and eliminates wrinkling and the distortion that would be caused by feed rollers, which have been found to result in non-uniform feed or so-called "line feed."

In accordance with another feature of the invention, the recorder is provided with means for cutting the web after the completion of the recording cycle at a point closely spaced from the final recording line or end of the picture without having to advance the web to a cut-off position.

This involves the step of cutting the web at a point where it is held by the guide in a trough-shaped configuration, which is accomplished by rotating a cutting blade mounted for rotation above the axis of the semi-circular guide and intersecting the folded sheet or strip. The cutting blade is arranged to move radially as it rotates which distributes the wear over a considerable length of the blade. After the web has been severed, it is gripped at the edges by side grippers which move to flatten the severed sheet for transfer into the feed or snatch rollers of the processor. As soon as the sheet is engaged by the feed rollers, the grippers are released and the feed and transfer grippers are restored to their normal positions in readiness for a subsequent recording cycle.

Since the recording web is pulled slowly through the curved guide as described, the web is only subjected to slight tension which minimizes any tendency to wrinkle or scratch the coated surface of the paper. Thus the face of the semi-circular guide may be metallic instead of being covered with velvet or other soft facing, which would prevent the exact positioning of the web required relative to the optical scanning system.

In accordance with another feature of the invention, the mechanism of the recorder is designed to operate in response to electric current and signals received from the remote transmitter. A conventional transmitter supplies carrier to the line circuit at the beginning of transmission, and the carrier is modulated by a phasing signal followed by the facsimile or picture signals. In order to utilize this mode of operation, the recorder is designed to start the recording cycle upon receipt of the carrier, adjust the input signal level and the phase of the optical scanner, record the picture in response to received signals, and then sever the recorded sheet or picture and transfer the sheet to the automatic processor when the carrier is terminated at the end of the transmission.

In the embodiment shown and described herein for the purpose of explaining the principles of the invention, the semi-circular guide may be stationary and the feed gripper attached to a carriage raised at a constant speed by a lead screw driven by a constant-speed motor. Suitable timing mechanism is provided to set and release the gripper and return it to the starting position where it engages the cut edge of the web when the recording of a subsequent picture starts. Timing mechanism is also provided for initiating the operation of the side grippers and when the snatch rolls of the processor pick up the severed sheet, the side grippers are returned to the normal or starting position. After passing through the processor, the finished picture is fed through a light trap to a collector box adapted to receive and store a number of finished pictures.

Other features and advantages of the present invention may be readily understood from a consideration of the following detailed description of the illustrative embodiment thereof shown in the accompanying drawings, wherein.

Figure 1:
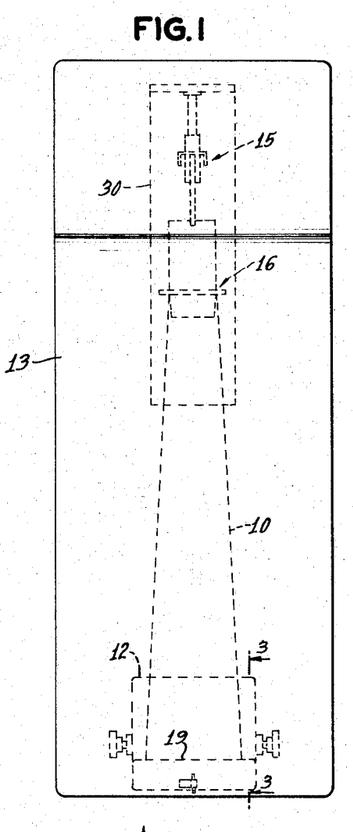
FIGS. 1 and 2 are front and side elevations of a photofacsimile recorder constructed in accordance with one embodiment of the invention and illustrating the general arrangement of the web feed, recording and processing units.
Figure 2:
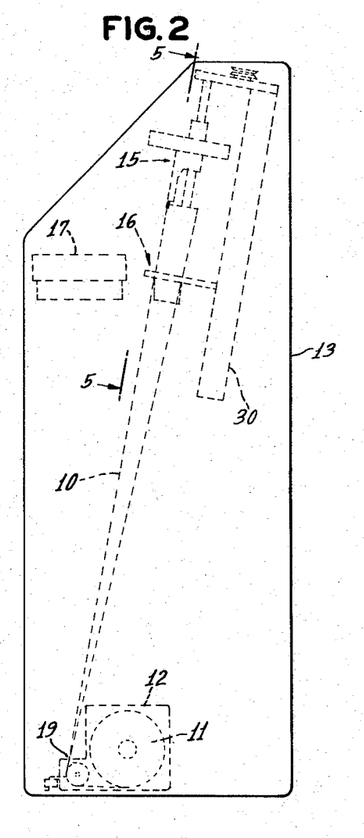
Figure 3:
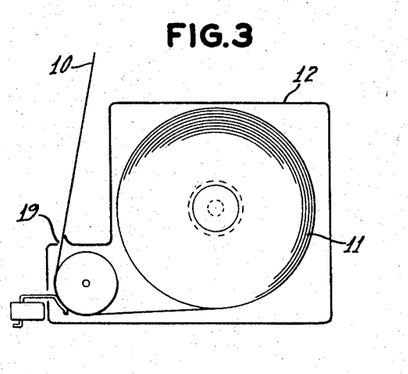
FIG. 3 is a cross-sectional view of the cassette showing the supply roll of film or paper.

In the illustrative embodiment shown in the drawings, a photofacsimile recorder is shown which is capable of unattended operation in response to signals from a remote transmitter. The recorder employs a continuous web or strip of recording material, such as photographic film or paper, and is adapted to record and deliver consecutive reproductions of a succession of transmitted photos or other subject matter. Referring to the drawings, and more particularly to FIGS. 1, 2 and 3, the photofacsimile recorder embodies means for recording on the strip or web 10 of light-sensitive material supplied from a supply roll 11 in a cassette 12 at the bottom of a light-tight enclosure or cabinet 13. The cabinet 13 may be of conventional design and the structural details, such as access doors, are omitted for the sake of simplicity.

Within the cabinet 13, a reciprocating carriage 15 is provided for supporting the paper-feed mechanism for advancing the recording strip past the recording assembly 16. The recorded areas or sections of the strip are severed, ejected from the recording mechanism and delivered to a processing unit 17 by automatically controlled mechanisms which will be described hereinafter in connection with the detailed illustrations of FIGS. 5 to 18 inclusive.

Figure 4:
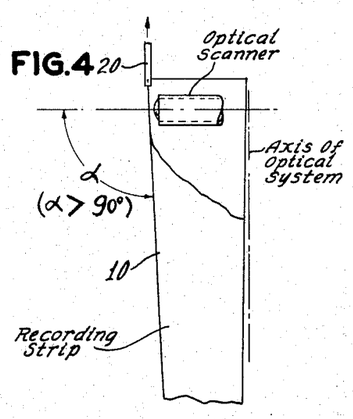
FIG. 4 is a fragmentary view showing the relation between the inclined axis of the optical scanner and the surface of the recording web adjacent the optical system.

The recorder employs a rotatable optical system 16 which generates a curved recording line. Accordingly the strip of recording paper or film 10 is folded or curved partly around the optical scanner assembly 16 as shown more clearly in FIGS. 4, 6 and 12. The rotatable optical system preferably comprises a conventional dual scanning arrangement having two diametrically opposed objective lenses for directing light from a recorder lamp to the surface of the light-sensitive paper to form line-by-line a latent image of the subject matter being received from the remote transmitter as the optical system rotates. The strip 10 of film or paper is pulled from the lip 19 of the cassette 11 by a feed gripper 20, shown more clearly in FIGS. 5, 6, 9 and 16, and the precise curvature of the strip of film or paper at the point of recording is obtained by employing a semi-circular gate or guide closely spaced from the plane of the optical scanner. When the strip is shaped in this manner, the upper rear edges of the folded strip are below the level of the center portion of the strip. In order to minimize the distortion of the recording line from this cause, the axis of the optical scanner is inclined as indicated in FIG. 4 so that the distance from the lip of the cassette to the center recording spot is approximately the same as the distance from the outside edges of the lip of the cassette to the recording spots at the ends of the recording line.

Web feed

An important feature of the invention is the web transport system for forming the strip of recording film or paper from the flat configuration into the curved form at the optical recording assembly and for advancing the strip uniformly through the recording assembly. It is essential to shape the strip or web without wrinkling and to avoid marring the coated surface of the strip. A slight irregularity in the paper feed would cause line grouping or uneven spacing of the recording lines which degrades the quality of the recording. The problem is more severe in the case where photographic paper is used, since the paper is relatively heavy and stiff and lacks the compliance of thin plastic film as used in video recording, for example. The problems involved in this area were overcome by the novel construction shown which involves pulling the strip or web through a semi-circular guide by gripping means 20 engaging the center of the web.

Figures 6, 8:
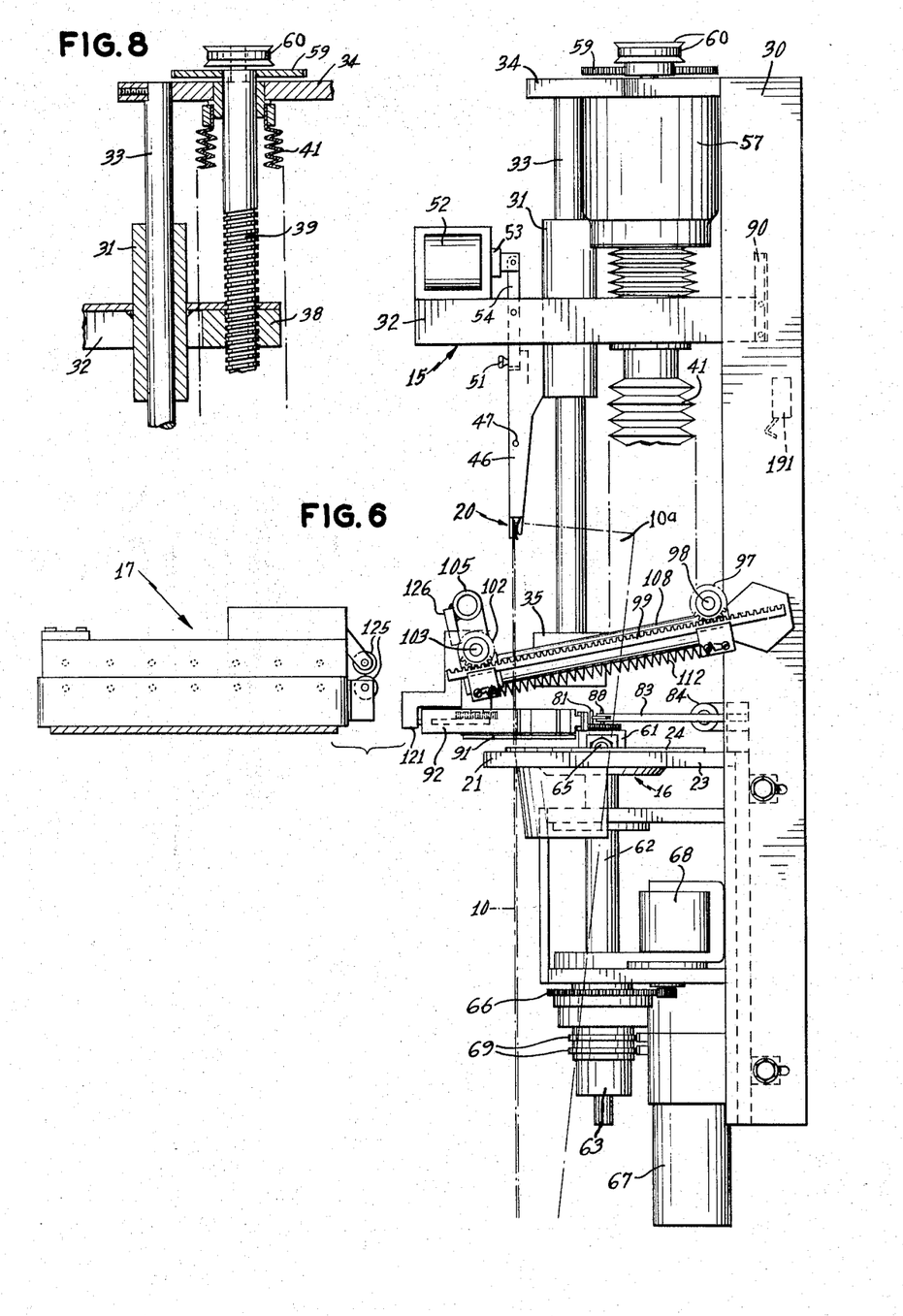
FIG. 6 is a side elevation of the carriage and associated units including the processor.
FIG. 8 is a detail sectional view taken on the line 8—8 of FIG. 7.
Figure 7:
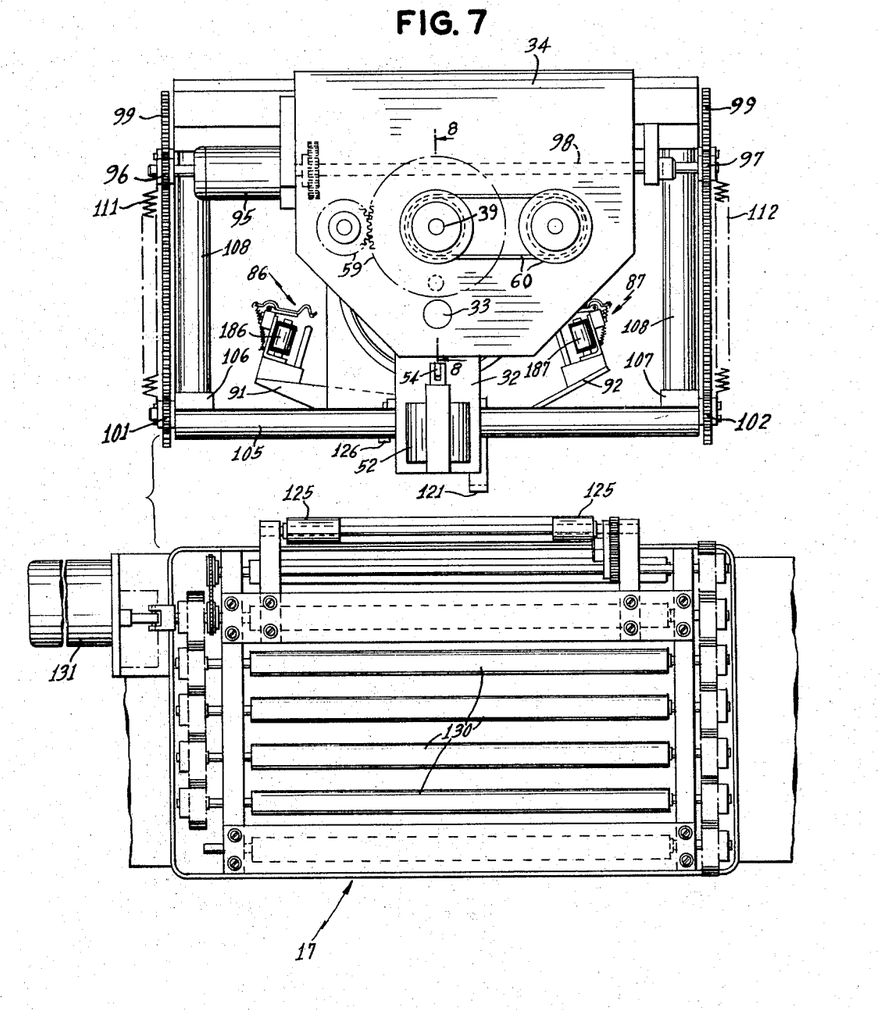
FIG. 7 is a plan view of the elements of the recorder shown in FIG. 6.
Figures 9, 10, 11, 16:
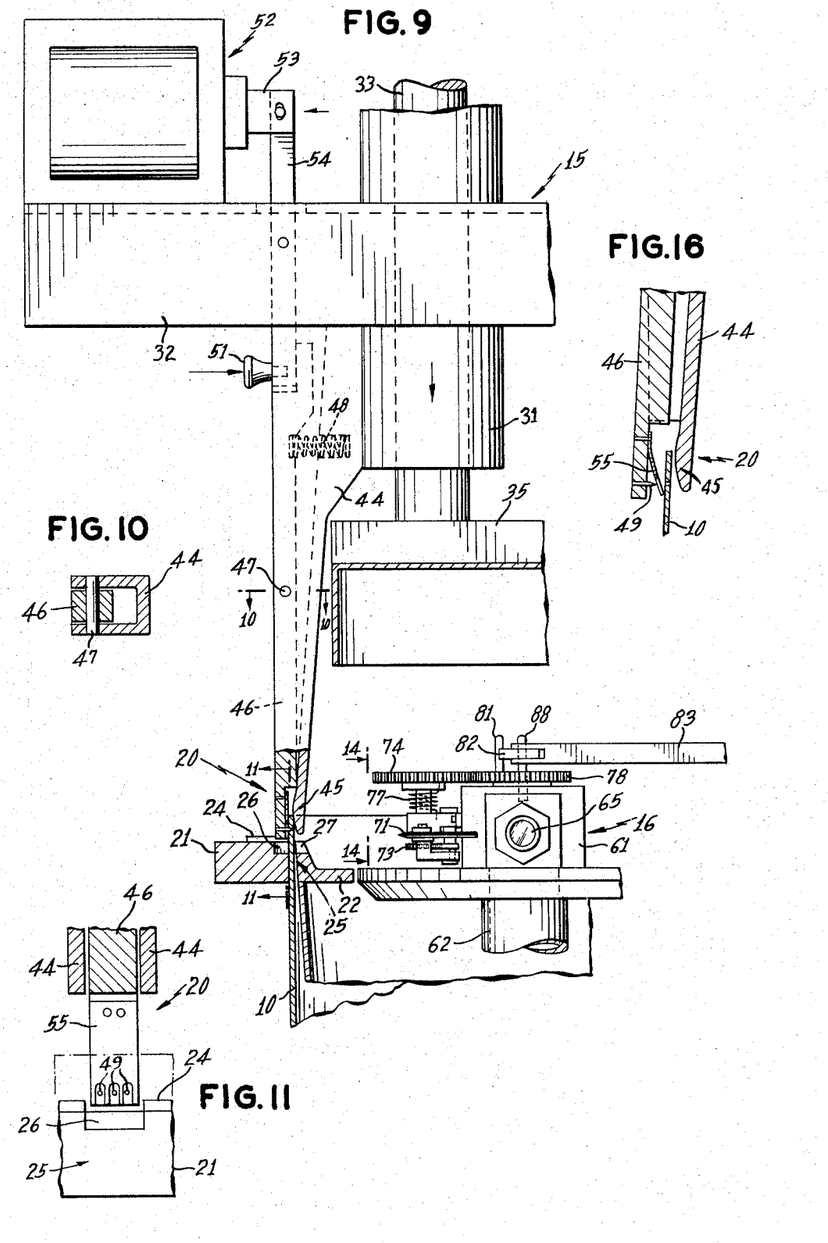
FIG. 9 is a view to an enlarged scale, partly in section, of the web guide and feed gripper.
FIGS. 10 and 11 are detail sectional views taken on the lines 10—10 and 11—11 respectively of FIG. 9.
FIG. 16 is a fragmentary view to an enlarged scale of the feed gripper.
Figure 12:
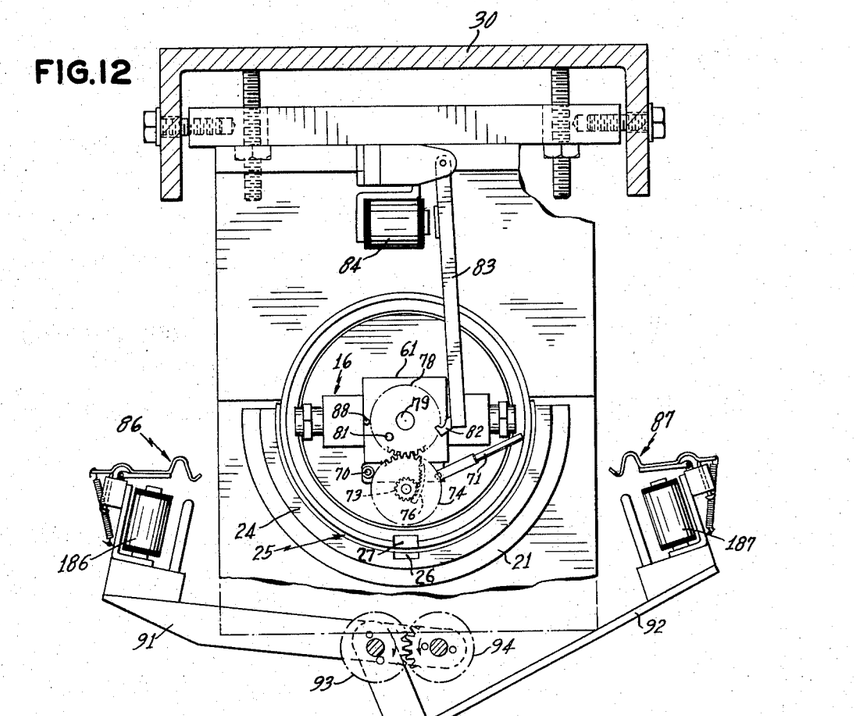
FIG. 12 is a fragmentary view of the mechanism for actuating the side grippers.

The web-feed arrangement shown includes a single central gripping finger 20 on the travelling carriage 15 and located above the semi-circular guide consisting of inner and outer arcuate members 21 and 22 mounted on a fixed supporting plate 23 as shown in FIGS. 6, 9 and 12. The arcuate members 21 and 22 are spaced apart to define a small semi-circular slot or gate 25 for holding the curved recording strip 10 precisely in the focus of the optical system 16 at the scanning line. A hard metal facing 24 on which the cutter blade slides is mounted on the top of the member 21. As shown in FIGS. 9 and 12, the arcuate guide members 21 and 22 are notched at 26 and 27 to clear the end of gripping finger 20 in its lowest position.

The gripping finger 20 is raised at a slow uniform rate to effect line-feed advance of the strip 10 past the recording assembly by the upward movement of the reciprocating carriage 15. As shown in FIG. 6, the carriage 15 is slidably supported on a fixed frame or bracket 30 at the rear of the recorder cabinet, the carriage being guided by a sleeve 31 attached to a plate or shelf 32 carrying the gripping finger 20. The sleeve 31 slides on a fixed guide rod 33 as the carriage is lifted and retracted, said guide rod being secured in the horizontal plates 34 and 35 attached to the fixed bracket 30. The shelf or mounting plate 32 for the gripper finger is provided at its rear end with a threaded nut 38 engaging the lead screw 39 which is journalled in suitable bearings in the plates 34 and 35. An extensible sleeve 41 may be provided as a dust shield for the lead screw 39 as shown. The rotation of the lead screw 39 in a manner to be described hereinafter lifts and retracts the carriage 15 and the attached gripping finger 20. As shown more clearly in FIGS. 9 to 11 and 16, the gripping finger 20 comprises a fixed vertical arm 44 attached to the reciprocating carriage, said arm 44 having a rounded tip portion 45 adapted to contact the coated surface of the recording strip or web 10. The gripping finger further comprises a second vertical arm 46 which is pivoted at 47 and is normally biased by a spring 48 towards the fixed arm 44. The pivoted arm 46 may be provided with one or more sharp pins 49 for positive engagement of the gripping finger with the recording material 10. The pivoted arm 46 may be actuated by the thumb piece 51 to release the web or strip 10 from the gripper finger or to open the gripper finger initially to receive the end of the web or strip when the rcorder is loaded with fresh recording material. During normal operation the pivoted arm 46 is operated automatically to release the web by a solenoid 52 as the recorded section of the web is severed and ejected. The movable core 53 of the solenoid 52 is attached to a pivoted lever 54 as shown in FIG. 9, which engages the upper end of the pivoted arm 46. When the arm 46 is actuated to the release position, a stripper spring 55 strips the web or strip 10 from the gripper pins 49.

Figure 5:
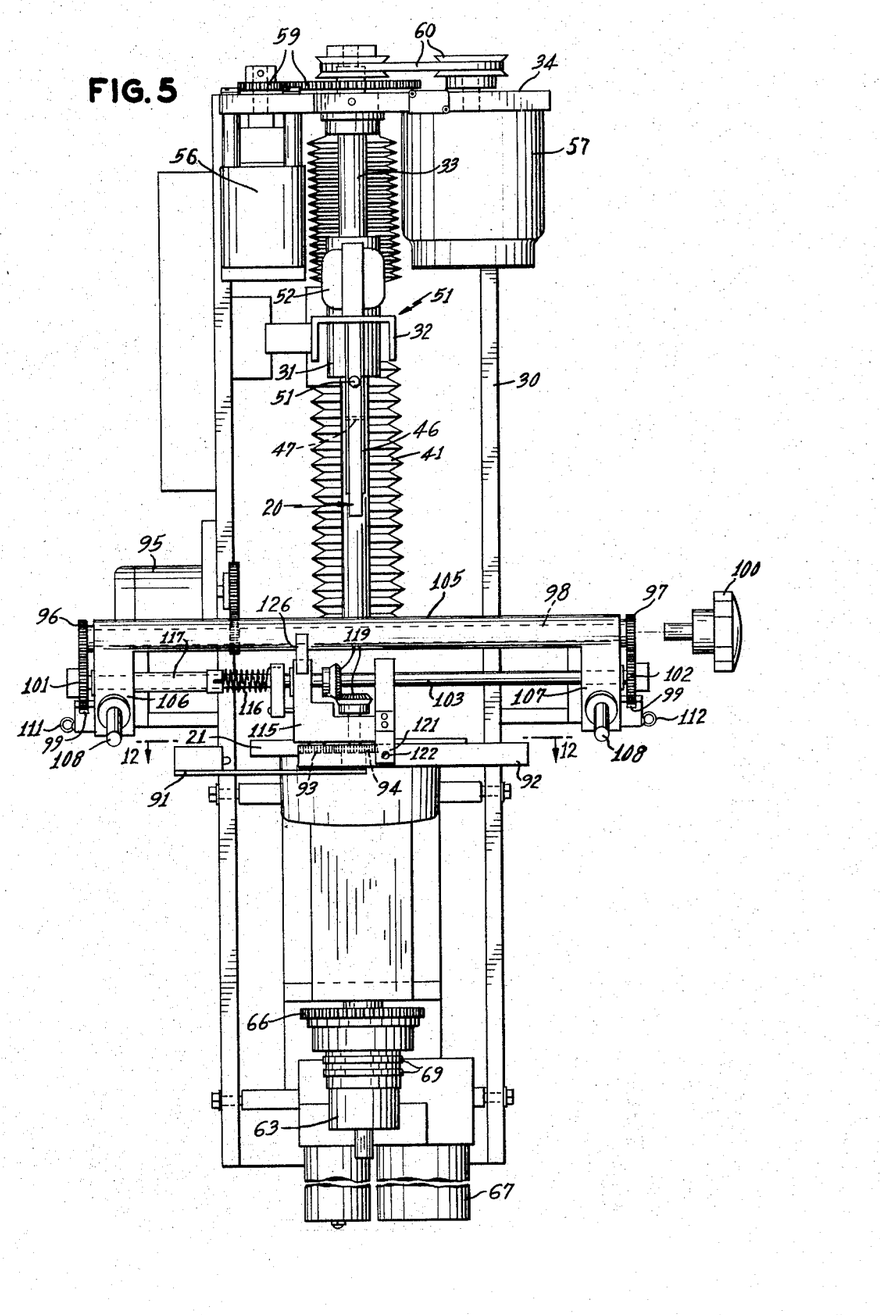
FIG. 5 is a front elevation of the carriage and optical system.

The lead screw 39 is driven by the lowspeed drive motor 56 through gearing 59, and by the highspeed drive motor 57 through the pulley and belt drive 60, as shown in FIGS. 5 and 6. When the motor 56 is energized, the lead screw rotates at a uniform low speed to raise the carriage 15, which supports the optical system 16 for scanning the recording sheet. At the end of the recording cycle, the motor 57 is energized by the control system to be described hereinafter, thereby returning the carriage 15 to the lower, or start, position.

*Rotating optical and cutter assembly*

Figure 15:
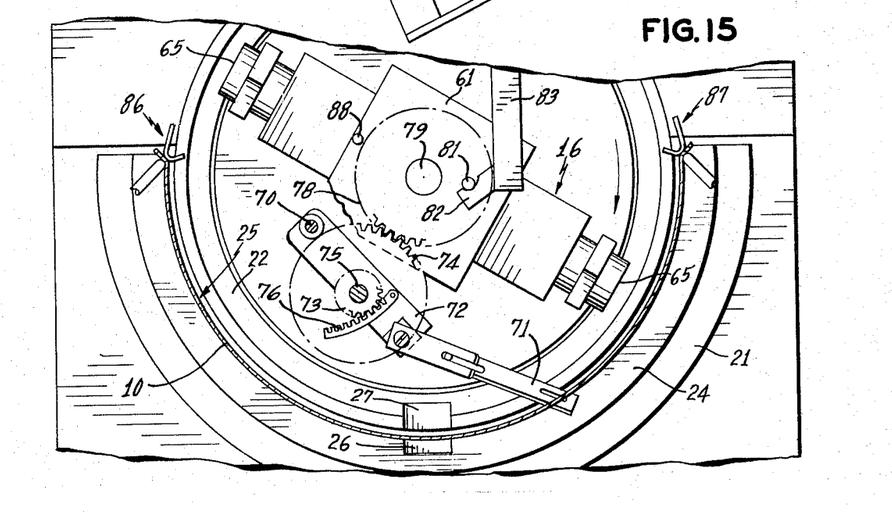
FIG. 15 is a fragmentary view to an enlarged scale of the web cutter.
Figure 17:
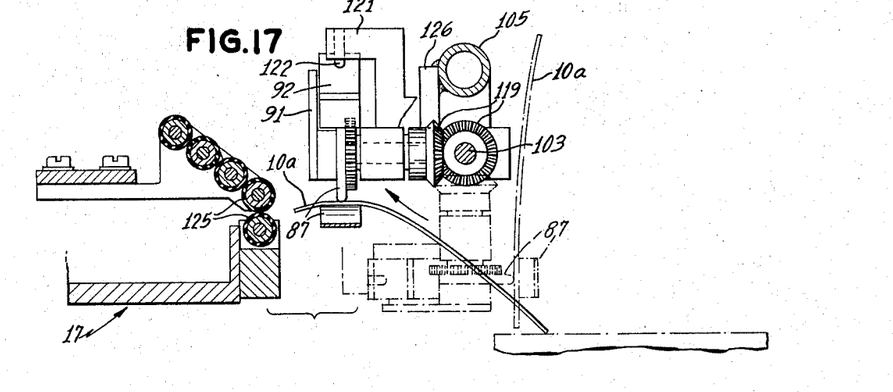
FIG. 17 is a view illustrating the transfer of the cut sheet to the processor.

The rotating optical system arranged for inside scanning of the web immediately above the semi-circular guide formed by the arcuate members 21 and 22, as shown in FIGS. 6, 9 and 12. In the embodiment shown, a rotating cutter blade assembly is mounted on the top of the optical assembly, as shown in FIGS. 9, 12 and 15. The dual optical system shown is conventional and comprises a hollow cap member 61 mounted at the top of a vertical tube 62 which carries a crater lamp 63 at its lower end. The cap member 62 supports two diametrically opposite objective lenses 65 through which the light from the recording lamp 63 is focused along the recording line of the semi-cylindrical recording strip 10 as the recording assembly rotates. The usual field lens and aperture plate are mounted adjacent the recorder lamp 63, and mirrors or reflecting surfaces are provided in the cap member 62 for directing the light to the objective lenses. The required distance between the aperture plate and each objective lens is obtained by the length of the tube 62 between the lamp and the output lenses. The dual-lens system of course is employed to start each successive scanning line at one edge of the strip 10 as the preceding line is finished. The rotating optical system 16 is driven and phased with the remote transmitter through a gear 66 by conventional driving and phasing mechanism 67. An auxiliary driving motor 68 may also be provided if desired to supply the extra power required by the cutter assembly which severs the recorded section 10a of the web 10. The modulated signals for energizing the recorder lamp 63 are supplied to the terminals of the lamp through slip rings 69 (see FIG. 6).

Figure 14:
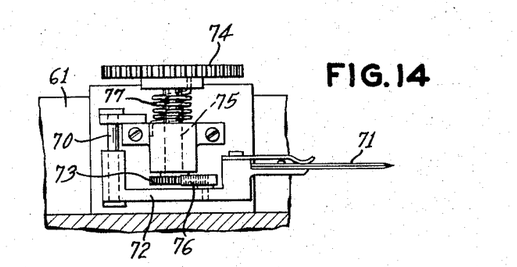
FIG. 14 is a fragmentary view of the web cutter from the plane indicated at 14—14 of FIG. 9.

The cutter assembly comprises a cutter or knife blade 71 attached to a holder arm 72 pivoted on the shaft 70 (see FIGS. 14 and 15). A pinion 73 and a gear 74 are pinned to a second shaft 75. The blade holder 72 carries a segment of a gear 76 meshing with the pinion 73. The arm 72 and pinion 73 are normally biased by a helical spring 77 surrounding the shaft 75, which biases the cutter blade to the retracted position shown in FIG. 12. The gear 74 meshes with a second gear 78 which is journaled on an extension or pin 79 on the axis of the rotatable optical assembly 16. The gear 78 carries a projecting pin 81 which normally rotates in a path which clears the hook-shaped operating member or latch 82. The hook-shaped member 82 is carried by the pivoted armature 83 of the cutter magnet 84. When the magnet 84 is energized at the end of a transmission, the armature 83 of said magnet is operated to move the hook-shaped member 82 into the path of the projecting pin 81, and the rotation of the gear 78 is arrested while the optical assembly 16 continues to rotate. The rotation of the optical assembly while the sun gear 78 is stopped, produces rotation of the planetary gear 74 about its axis, thereby rotating the pinion 73 and swinging the knife blade 71 into its operative position as shown in FIG. 15, through engagement of the pinion with the segment gear 76.

At this time a pair of side grippers 86 and 87 are moved to the positions shown, in which the edges of the folded recording strip 10 are firmly held during the cutting operation. This prevents the action of the cutter blade 71 from displacing or shifting the position of the web 10. After the blade 71 has severed the recorded section 10a of the web, a projection 88 on the rotating optical assembly engages the armature 83 to release the hook-shaped member 82 from the pin 81. The gears 74 and 76, and the arm 72 carrying the blade 71, are then returned to normal by the coil spring 77. Thus the cutting mechanism is rendered inoperative and the cutter blade 71 retracted to the position shown in FIG. 12 after the blade has made only part of a revolution around the axis of the optical system. At this time the side grippers 86 and 87 are actuated to flatten the recorded copy 10a from its curved form for transfer to the processor 17 (see FIG. 13). Since the length of the recorded section to be processed has to be greater than a predetermined minimum length in order to pass through the feed rolls and processing stages of the processor, a guard switch 191 (FIG. 6) may be mounted on the rear bracket 30 in a position to be operated by a vertical actuating bar 90 on the carriage 15 only after the carriage has been elevated a distance equal to said predetermined length, say three inches. The switch 191 is arranged, as will be explained hereinafter, to prevent the operation of the cutter mechanism until after a subsequent transmitting cycle when sufficient length of copy has been recorded for handling by the ejecting or processing devices.

*Ejection and transfer mechanism*

Any suitable mechanism for ejecting the recorded section 10a of the web 10 and transferring it to storage or a processing unit may be employed, preferably, according to the present invention, utilizing swinging gripper members arranged to grip the edges of the recorded section. As shown in the drawings by way of example, the grippers 86 and 87 which hold the edges of the recorded section during the cutting operation are utilized to withdraw the sheet and transfer it to the processor 17. To this end the grippers 86 and 87 are each mounted on a pivoted arm 91 and 92, respectively, attached to the meshing gears 93 and 94 so that rotation of either of said gears swings the grippers 86 and 87 in unison to the positions shown in dotted lines in FIG. 13. As shown by way of example, the grippers are electrically operated to grip the recorded section by electromagnets 186 and 187. The movement of the grippers flattens the recorded section 10a adjacent the trailing or bottom end of the recording area. The gears 93 and 94 are driven by transfer motor 95, FIG. 7 through a rack-and-pinion drive mechanism which includes pinions 96 and 97 on the shaft 98 driven by the motor 95, slidably mounted racks 99 at each side of the recording unit and pinions 101 and 102 meshing with the racks 99 and attached to a transverse shaft 103 which actuates the gears 93 and 94.

Figure 13:
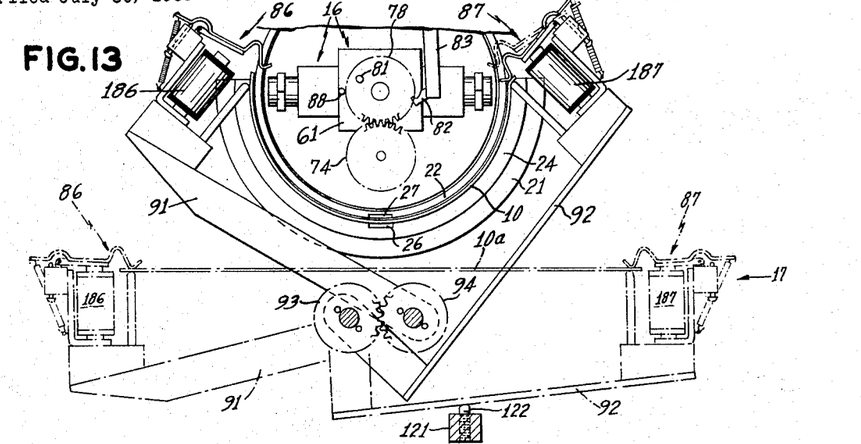
FIG. 13 is a similar view illustrating the operation of the side grippers.
Figure 18:
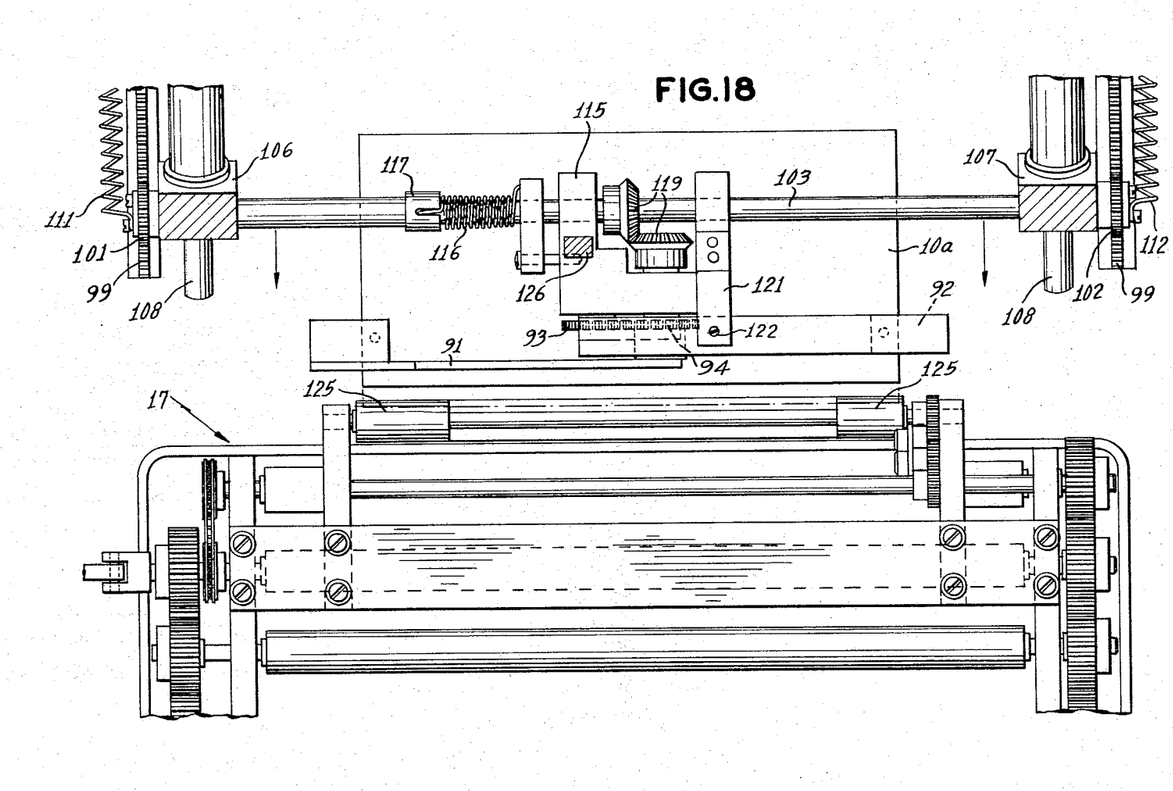
FIG. 18 is a plan view to an enlarged scale of the sheet transfer assembly shown in FIG. 17.

The shaft 103 is supported in a slidable frame 105, as shown in FIGS. 5, 6 and 18, said frame 105 having extensions 106 and 107 at the ends thereof to provide bearings for the shaft 103 and carrying supporting sleeves on two spaced guide rods 108 fixed at their rear ends to the frame of the machine. The frame 105 which carries the shaft 103 and the gripper arms 91 and 92 is normally held in the retracted position shown in FIGS. 6 and 18 by tension springs 111 and 112. The shaft 103 carries a pivoted block 115 which is freely rotatable on the shaft 103 but is normally biased to the position shown in FIG. 18 by a coil spring 116 which is fixed at one end to a sleeve 117 attached to the extension 106 of the frame 105. Rotation of the shaft 103 turns the transfer arm gears 93 and 94 through bevel gearing 119 when the shaft 103 is driven by the transfer motor 95 while the supporting block 115 is held in its normal position by the spring 116. The block 115 also carries a stop member 121 which has a projecting end portion disposed in the path of transfer gripper arm 92 as shown in FIGS. 13 and 18. In order to provide precise adjustment of the angular position of the arm 92 for engagement with the stop 121, an adjustable member, such as a set screw 122, is threaded in the stop member 121 in a position to engage the arm 92.

Since the pivoted block 115 is normally positioned by the spring 116 as shown, when the shaft 103 is turned by the transfer motor 95, the rotation of the bevel gearing 119 rotates the gears 93 and 94 to swing the gripper arms 91 and 92 into the positions shown in dotted lines in FIG. 13. At this time the engagement of the arm 92 with the stop member 121 locks the gears 93 and 94, and the bevel gearing 119, so that further rotation of the shaft 103 turns the block 115 about the axis of said shaft against the tension of the spring 116, thereby rotating the gripper arms 91 and 92 about the axis of the shaft 103. This raises the edge of the severed sheet 10a to swing the trailing edge of the sheet toward the snatch rolls 125 of the processor 17 (see FIG. 17). After the block 115 has been rotated through a predetermined angle, it engages a stop member 126 on the frame 105 to prevent further rotation of the block around the shaft 103. The engagement of said block with the stop member 126 locks the pinions 101 and 102 on shaft 103, and further movement of the racks 99 effects a forward movement of translation of the frame 105 on the guide 108 and, thereby moving the gripper arms 91 and 92 with the recorded section 10a held thereby until the end of the recorded section can be picked up by the snatch rolls 125 of the processor 17. The grippers 86 and 87 are then released and the transfer mechanism restored to normal by the springs and by reversing the transfer motor 95.

The timing and control apparatus for operating the recording, cutting and transfer mechanisms will be described hereinafter.

The recorded section 10a containing the transmitted picture or photo may be delivered by grippers 86 and 87 to a collection receptacle for subsequent processing. It is convenient however to employ a conventional processor 17 comprising trays for developer and stabilizing solutions, and a series of feed rolls 130 in the trays driven by a motor 131 to effect immersion of the film or paper in the solutions for the desired time and then deliver the processed film to a suitable collection box or receptacle (not shown). It will be evident that the recorder embodies means for recording a consecutive series of separate pictures or news photos and, if desired, for processing and fixing the exposed film or paper, the machine being adapted for unattended operation. An important feature is the provision for severing the web or film or paper at the termination of a transmitting cycle, and near the end of the recorded area, thus conserving the photographic material in the case of the transmission of photos or subject matter of different sizes.

*Control apparatus*

Figure 19:
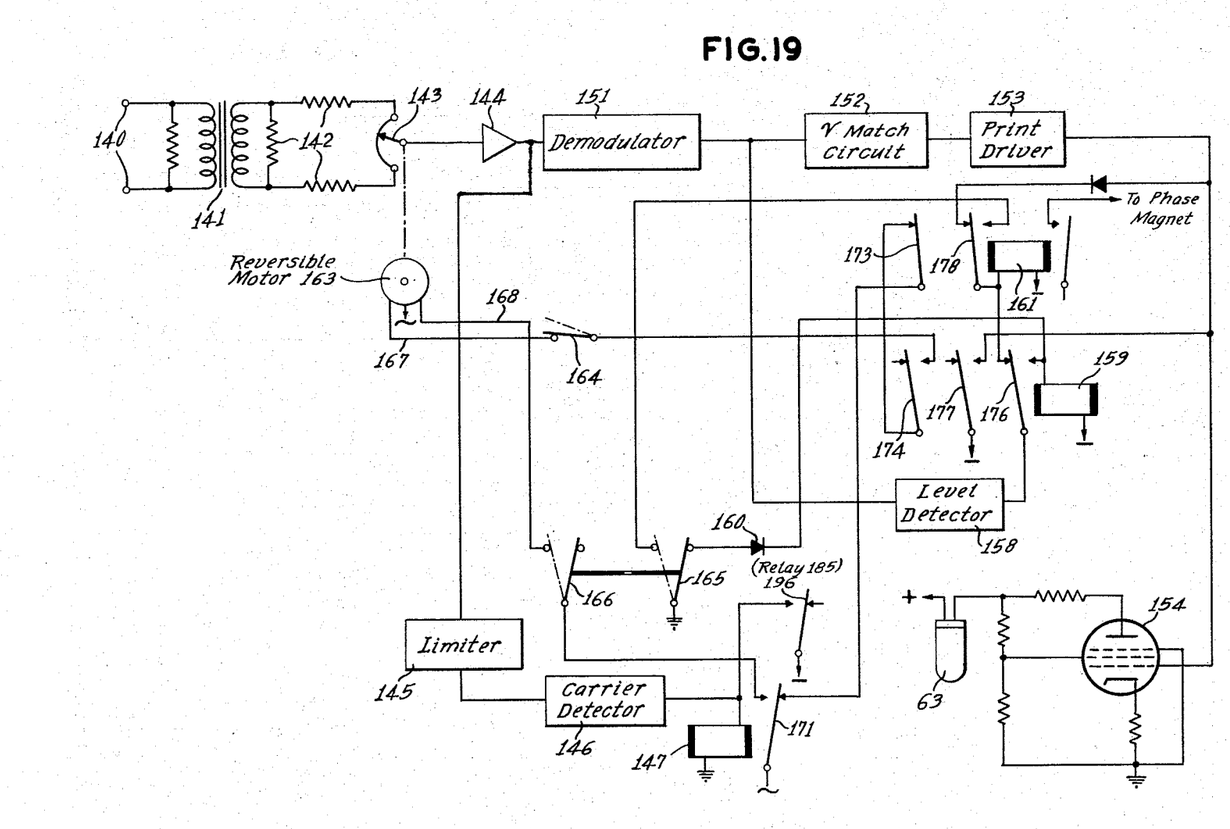
FIG. 19 is a circuit diagram of the principal elements of the control circuits for controlling the various functions of the recorder shown in FIGS. 1 to 18.

A typical control circuit for phasing and operating the recorder in response to the transmission of a carrier at the commencement of a recording cycle is shown in FIG. 19. This figure shows a carrier detector which responds to presence of a carrier and to the termination of the carrier at the end of the transmitting cycle for controlling the feeding and severing of the recording web and the transfer of the recorded subject matter on the severed sheet to the processor 17 by means of control relays and timing mechanisms shown in FIGS. 20 to 25 inclusive. It is to be understood that the detailed apparatus shown, for automatic operation of the recorder, is merely illustrative and any suitable control apparatus may be employed where unattended operation is desired.

It is assumed that a conventional transmitter is employed in the network, such as a newsphoto system, the recorder control system being located at each one of the receiving stations. The transmitter impresses a carrier signal on the line circuit connected to the terminals 140 at the commencement of the transmitting cycle, modulates the carrier with phasing and intelligence signals, and cuts off or interrupts the carrier at the end of the transmitting cycle. A transmitter of this type is disclosed for example in the patent to K. R. McConnell et al., No. 2,640,874 granted June 2, 1963, except that the transmitter described in this patent also generates a "start" signal which is not utilized in the present circuit. The control system shown comprises mainly conventional elements and a brief description of the functions and interconnections will suffice to make the operation clear.

The received carrier is coupled through transformer 141, series and parallel resistors 142 and a level control 143 to an amplifier 144, and through a conventional limiter 145 to a carrier detector 146. The rectified output current of the carrier detector 146 is employed to operate a carrier detector relay 147 in response to the absence of a received carrier, said relay being deenergized when the carrier is received on the line circuit. The output of the amplifier 144 is impressed upon a demodulator 151, a Gamma matching or correcting circuit 152, and a print amplifier 153, 154 connected to the recording lamp 63. The usual correcting circuit 152 is employed when necessary to compress or expand the signal at one end of the signal range as required by the characteristics of the recording material, to obtain a desired tone scale in the developed photo or reproduction. As shown, a level detector circuit 158 is also connected to the output of the demodulator 151 which controls the energization of a level-set relay 159. Another relay 161 controls the phasing of the recorder in a manner to be described. Relays 147 and 159 are normally energized in the standby condition of the circuit between transmissions. The level control 143, as shown, comprises a potentiometer having its adjustable contact connected to a reversible motor 163, so that the maximum or "white" signal impressed upon the amplifier 144 can be maintained constant or set to a predetermined level for each transmission by the operation of said motor. The level control 143 further includes a limit switch 164, and off-normal switches 165 and 166, associated with the movable contact arm of the level control. The motor 163 actuates the contact arm away from its zero or "home" position when current is supplied through the conductor 167 to the motor and reverses rotation to return the contact arm to the "home" position when current is supplied through the conductor 168. The level-set relay 159 is energized during "standby" through rectifier 160 and off-normal switch 165.

Figures 23, 24, 25:
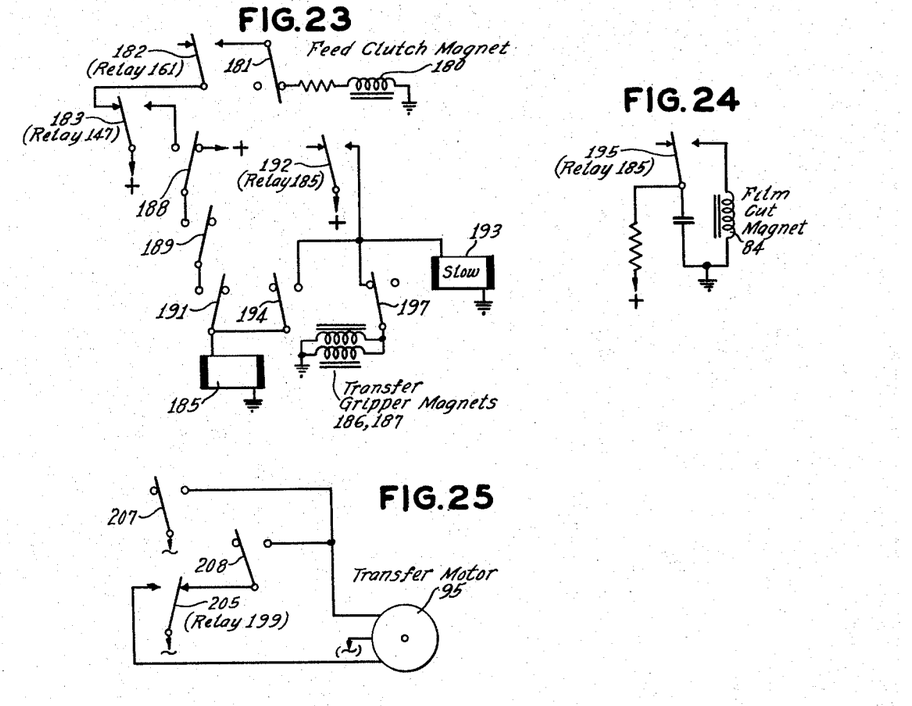

At the start of transmission, steady carrier received over the line circuit and impressed upon the carrier detector 146 deenergizes relay 147. The paper feed motor 58 and scan motor 67 for rotating the optical system are energized by contact 170 of relay 147 (see FIG. 20). The motor 163 is energized through a circuit that may be traced through contact 171 of relay 147, contact 173 of relay 161, contact 174 of relay 159 and the limit-switch contact 164. The motor 163 advances the movable contact of the level control 143 from the "home" position until a predetermined signal level is reached at the input of the level detector 158. The off-normal contacts 165 and 166 open but relay 159 remains locked up through its contact 176. When the predetermined signal level is reached, the level detector relay 159 is deenergized and opens the circuit of the motor 163 at the contact 174. The proper voltage will then be supplied to the grid of the print amplifier 154 to record "white" (maximum signal). The circuit of the phase relay 161 is transferred to the output of level detector 158 through contact 176. The recorder lamp 63 is not energized during this time since the pentode amplifier 154 is biased to cut off, first through contact 177 of relay 159, and then through contact 178 of relay 161. The phasing pulses from the transmitter are represented by periodic interruptions in the carrier and the phase relay 161 remains deenergized until a phasing pulse is received. When the first zero or low-current phasing pulse is received, the output current from level detector 158 rises and the phase relay 161 becomes energized through contact 176 of relay 159. The feed clutch 180, FIG. 23, is energized through limit switch 181, contact 182 of phase relay 161 and contact 183 of relay 147, to release the rotating optical system of the recorder mechanism in the proper phase relation with the transmitter. The phase relay 161 remains locked up through a locking circuit including its contact 178 and the off-normal contact 165 of the level control to ground.

The cut-off bias on the amplifier 154 for disabling the recorder lamp 63 is removed at the contact 178 of relay 161, thus permitting the recorder lamp 63 to respond to the modulated intelligence signals received over the line circuit and amplified by the amplifiers 144, 153 and 154.

At the end of each copy transmission, when carrier is removed from the line at the transmitting station, the carrier detector relay 147 becomes energized and deenergizes the feed clutch magnet 180 at the contact 183 of said relay. Relay 185, FIG. 23, becomes energized through a circuit including contact 183 of relay 147, the upper limit switch 188 associated with the recorder carriage 15, reed contact 189 and guard contact 191. The guard contact 191 remains open until a predetermined length of the web 10 has been recorded in order to prevent cutting a short length of paper or film which would not feed through the processor. The reed contact 189 is operated by the rotation of the optical system to which the rotating cutter is connected so that the cutting operation is initiated only as the cutter blade 71 approaches the edge of the web 10. When the relay 185 is energized, power is supplied through its contact 192 (see FIG. 23) and lower limit switch 197 of the carriage to energize the slow-acting relay 193 and the operating magnets 186, 187 of the transfer grippers 86 and 87. Relay 185 is locked up through contact 192 and the lower limit switch 194 which opens when the carriage 15 reaches its lowest position where the gripper 20 is positioned for engagement with the end of the web 10 at the start of the next transmitting cycle. The energization of relay 185 closes the circuit of the film cut magnet 84, FIG. 24, through contact 195 of said relay. Another contact 196, FIG. 19, of relay 185 locks up the carrier detector relay 147.

Figures 20, 21, 22:
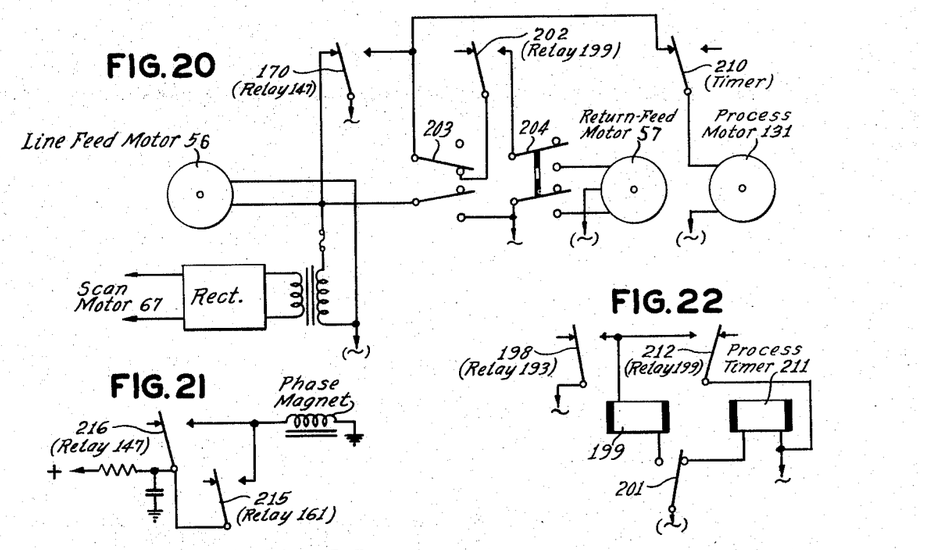
FIGS. 20 to 25, inclusive, are circuit diagrams of auxiliary control relays and the driving motors, and the magnets controlled thereby, said circuit diagrams being complementary to the circuit diagram of FIG. 19.

After a predetermined time interval, say two seconds, slow-acting relay 193 actuates its armature to close contact 198, FIG. 22, of said relay to energize relay 199 through a circuit including limit switch 201 of the sheet transfer. The fast carriage return motor 61, FIG. 20, is energized to return the carriage 15 of the recorder to its lower or start position by contact 202 of relay 199, through a circuit including contact 170, limit switch 203 and forward limit switch 204 on the carriage 15. The operation of relay 199 also closes at its contact 205, FIG. 25, the circuit of reversible sheet transfer motor 95 to eject the cut sheet from the recorder. The transfer mechanism includes limit switches 207 and 208 to control the cycling of said mechanism in the reverse direction under the control of relay 199. The processor driving motor 131 is energized by the closing of contact 210, FIG. 20, of timer 211 set for the required processing time, for example, up to 30 seconds or more. When the carriage 15 returns to the lower or start position, relay 199 is deenergized by the opening of limit switch 201 on the carriage, and the timer 211 starts up.

When the carrier detector relay 147 becomes energized at the end of the transmitting cycle, in response to the absence of carrier on the line, power is supplied to the level-control motor 163 through contact 171 of said relay and off-normal contact 166 to operate the motor in a direction to restore the movable contact of the level control 143 to its "home" position, where the contact 166 opens the motor circuit. At the same time, the operation of off-normal contact 165 deenergizes phase relay 161, and energizes the level-set relay 159. The control system is now restored to standby condition in readiness for the next transmission.

It is to be understood that the above-described recorder and control system are illustrative of the application of the principles of the invention. As disclosed in detail, the apparatus provides photorecording of improved quality, economy in the use of photographic recording material and automatic unattended operation. However other arrangements may be devised by those skilled in the art without departing from the spirit and scope of the invention. Thus, by way of example and not of limitation, elements of the recorder may be employed in apparatus of different design from that shown and described herein, and the various functions may be controlled manually in part if desired, instead of utilizing an entirely automatic control system. It will be obvious that other structures known to the art may be employed to accomplish certain functions, such as the recording, transfer, actuating and timing functions.

What is claimed is:

1. A photofacsimile recorder comprising
   recording mechanism including a recorder lamp and a rotatable optical system for focussing the light from said recorder lamp along an arcuate recording line during rotation of the optical system,
   means for supplying a continuous strip of film or paper adjacent said recording line,
   an arcuate guide for said strip adjacent said optical system,
   a movable gripper finger arranged to grip the strip only at a small area at the center of said strip, leaving the lateral edges thereof unconstrained, and
   means for imparting movement to said gripper finger in a direction to advance said strip through said guide.

2. A photofacsimile recorder comprising
   means for supplying a continuous strip of film or paper to the recorder,
   recording mechanism having a recorder lamp and rotatable dual optical system for directing light from said lamp to the surface of said strip of film or paper,
   means for supporting said strip in semi-cylindrical folded form adjacent said optical system,
   a gripper finger arranged to grip the middle of the folded end of said strip, leaving the lateral edges thereof unconstrained,
   means for moving said finger to advance said folded strip past said optical system during the recording operation, and
   means to automatically sever the recorded section of said strip.

3. A photofacsimile recorder comprising
   means for supplying a continuous strip of film or paper in a flat configuration to the recorder,
   recording mechanism having a recorder lamp and a rotatable optical system rotating in a fixed plane for directing light from said lamp to the surface of said strip of film or paper,
   means for supporting said strip in semi-cylindrical form adjacent the plane of said optical system,
   the strip of film or paper being inclined at an angle with said plane so that the line scanned by the optical system across the width of the folded web approaches a straight line to minimize distortion of the recorded image, and
   means including a gripper finger arranged to grip only the center of the folded edge to advance the strip or film uniformly during the recording cycle.

4. A photofacsimile recorder comprising
   recording mechanism including a recorder lamp and a rotatable optical system,
   means for supplying a continuous strip of film or paper to said recording mechanism including means for transversely curving said strip to partly surround said optical system,
   means to sever recorded sections of said strip adjacent the plane of rotation of said optical system,
   a gripping member arranged to grip only the center of said curved strip of film or paper, and
   means to position said gripping member, first, to effect line-feed advance of the strip through said recording mechanism and, second, to move said member in the opposite direction for engagement with the end of said strip from which a recorded section has been severed.

5. A photofacsimile recorder comprising
   recording mechanism including a recorder lamp and a rotatable optical system,
   a cassette containing a strip of recording film or paper in roll form,
   means for transversely curving said strip from the lip of the cassette to partly surround said optical system,
   a reciprocating carriage,
   a gripping member on said carriage arranged to grip only the center of said curved strip to effect line-feed advance of the strip through said recording mechanism,
   means to sever recorded sections of said strip, and
   means to actuate said carriage for forward and reverse movement of said gripping member.

6. A photofacsimile recorder according to claim 5, in which the axis of travel of the reciprocating carriage is inclined at a predetermined angle to the axis of the rotating optical system such that the recorded spots at the ends of the recording line on said film or strip are substantially equidistant with the central recording spot from the lip of the cassette, to minimize distortion of the recording line.

7. A photofacsimile recorder comprising
   recording mechanism including a recorder lamp and a rotatable optical system,
   means for supplying a continuous strip of film or paper to said recording mechanism,
   means including a movable gripper finger for advancing said strip through the recording mechanism,
   means to actuate said gripper finger in the direction of the strip advance,
   means to sever recorded sections of said strip, and
   means for coordinating and timing the operation of said recording mechanism, said strip advancing means and said severing means.

8. A photofacsimile recorder comprising
   recording mechanism including a recorder lamp and a rotatable optical system,
   means for supplying a continuous strip of film or paper to said recording mechanism,
   means including a movable gripper finger engaging only the center of said strip for advancing the strip past said recording mechanism,
   means to sever recorded sections of said strip,
   a processor for developing and fixing recorded copy sections,
   means for transferring the severed sections of the strip to said processor, and
   means for coordinating and timing the operation of said recording mechanism, said strip advancing means, and said severing and transfer means.

9. A photofacsimile recorder comprising
   recording mechanism including a recorder lamp and a rotatable optical system for focusing the light from said recorder lamp along an arcuate recording line during rotation of the optical system,
   means for supplying a continuous strip of film or paper to said recording mechanism,
   a semi-circular guide for positioning said strip of film or paper adjacent said recording line,
   strip-feeding means engaging only the center of said strip, leaving the lateral edges thereof unconstrained,
   means for severing recorded copy from said strip, and
   means including a lead screw for slowly advancing said strip-feeding means during the recording cycle and for rapidly returning it to the strip for a subsequent recording cycle after a copy section has been severed from said strip.

10. A photofacsimile recorder comprising
    recording mechanism including a recorder lamp and a rotatable optical system,
    means for feeding a continuous strip of film or paper through the recorder adjacent said recorder mechanism to expose the film or paper to the light from said lamp through said optical system, means for starting and stopping said feeding means at the beginning and end respectively of each picture transmission, means for severing the recorded section of said strip at the end of each picture transmission substantially at the end of the recorded area, and means including a pair of side grippers engaging opposite edges of each severed section for ejecting each section from the recording mechanism.

11. A photofacsimile recorder comprising recording mechanism including a recorder lamp and a rotatable optical system, means for supplying a continuous strip of film or paper to said recording mechanism, means for supporting said strip in a substantially cylindrical configuration around part of the circumference of said rotatable optical system, means for advancing said strip past said optical system during the recording cycle, means for severing the recorded section of said strip at the end of the recording cycle while it is held in substantially cylindrical configuration, and means including a pair of gripper fingers engaging opposite edges of the severed section of the strip for straightening the severed section and ejecting the same in flattened shape.

12. A photofacsimile recorder according to claim 11, in which the means for severing the recorded section of the strip of film or paper includes a rotatable cutting blade revolving in a plane adjacent the plane of rotation of said optical system, and means to impart a radial movement to said cutting blade as it rotates to severe said strip.

13. A photofacsimile recorder comprising recording mechanism including a recorder lamp and a rotatable optical system, means for supplying a continuous strip of film or paper to said recording mechanism, means including a gripper finger engaging the center of said strip for advancing the strip past said optical system during the recording cycle, means including a pair of gripper fingers engaging opposite edges of the strip after a section has been recorded for ejecting the recorded section, a processor unit having snatch rolls at the inlet end thereof, means including said pair of gripper fingers for presenting the forward edge of the recorded section to the snatch rolls of said processor, and means for releasing said pair of gripper fingers from the strip when the strip is picked up by said snatch rolls.

14. In a facsimile recording system, in combination, a line circuit, a facsimile recorder including means to record subject copy on a strip of film or paper, means to advance said strip through said record means, and means to sever and eject recorded sections of said strip, means to energize and phase said record means in response to carrier current and phasing signals received over said line circuit, and means to operate said means to sever and eject recorded sections in response to a change in carrier current at the end of transmission.

15. In a facsimile recording system, in combination, a line circuit, a facsimile recorder including means to record subject matter on a strip of film or paper and means to sever recorded sections of said strip adjacent the end of each section irrespective of the length of the section, means to energize said record means in response to carrier current received over said line circuit at the start of transmission, and means to operate said means to sever the strip in response to reduction in the amplitude of the carrier current at the end of transmission.

References Cited
UNITED STATES PATENTS

| | | | |
|---|---|---|---|
| 2,127,331 | 8/1938 | Fulton | 178—11 |
| 2,443,953 | 6/1948 | Gillespie | 178—6.6 |
| 2,511,892 | 6/1950 | Wise | 346—24 |

RICHARD B. WILKINSON, *Primary Examiner.*

MICHAEL LORCH, *Assistant Examiner.*